United States Patent

Dean

Patent Number: 5,946,321
Date of Patent: Aug. 31, 1999

[54] MULTI-TOPOLOGY NETWORK COMMUNICATION LINK INTERFACE

[75] Inventor: Alexander G. Dean, Pittsburgh, Pa.

[73] Assignee: Otis Elevator Company, Farmington, Conn.

[21] Appl. No.: 08/769,821

[22] Filed: Dec. 19, 1996

[51] Int. Cl.[6] .......................... H04L 12/403; H04L 12/28
[52] U.S. Cl. .......................... 370/451; 370/452; 370/403
[58] Field of Search .................................. 370/258, 462, 370/458, 463, 419, 402, 403, 440, 405, 223, 224, 221, 222, 453, 451, 452

[56] References Cited

U.S. PATENT DOCUMENTS

| | | | |
|---|---|---|---|
| 4,596,011 | 6/1986 | Kobayashi | 370/445 |
| 4,789,982 | 12/1988 | Coden | 370/451 |
| 4,803,485 | 2/1989 | Rypinski | 370/452 |
| 5,422,885 | 6/1995 | Nadkarani | 370/451 |
| 5,576,702 | 11/1996 | Samoylenko | 370/447 |
| 5,642,351 | 6/1997 | Baran | 370/449 |

*Primary Examiner*—Ajit Patel
*Assistant Examiner*—Ricardo M. Pizarro

[57] ABSTRACT

A communication interface 122 for a network having a plurality of nodes 100–108 and a communication link 124, 126 (120) connected between predetermined ones of the nodes 100–108 which propagates bus data, includes a first shared communication circuit 128, to be connected in series with the link 124,126, which receives the bus data and passes shared data along the link 124,126, a second shared communication circuit 136,142, connected to one port 129 of the circuit 128, which receives the bus data from the link 124,126 and passes the shared data, and which receives the shared data and couples the shared data onto the link 126, a first unshared communication circuit 144,148, connected to the port 129 of the circuit 128, which receives the bus data from the link 126 and passes the unshared data, and which receives the shared data and couples the unshared data onto the link 126, a second unshared communication circuit 130,134, connected to another port 127 of the circuit 128, which receives the bus data from the link 124 and passes the unshared data, and which provides unshared data onto the link 124, and the first shared communication circuit 136 not passing the unshared data.

13 Claims, 10 Drawing Sheets

MULTI-TOPOLOGY NETWORK COMMUNICATION LINK INTERFACE

CROSS REFERENCES TO RELATED APPLICATIONS

U.S. patent application Ser. No. 08/772,036 filed Dec. 12, 1996 now U.S. Pat. No. 5,914,957, entitled "Automatic Node Configuration with Identical Nodes", filed contemporaneously herewith, contains subject matter related to that disclosed herein.

TECHNICAL FIELD

This invention relates to network communication links and more particularly to a multi-topology network communication link interface.

BACKGROUND ART

It is known in the art of communication networks for a plurality of nodes to be connected together by a communication link over which the nodes communicate by sending and/or receiving data. The link may be connected to the nodes in a shared (or bus) topology and/or a sequence of separate point-to-point links (or ring or unshared) topology. With a shared topology, data on the link is accessible by each of the nodes connected to the link, and any one of the nodes may communicate with any other node connected to the shared link. However, in a ring or unshared topology, only certain predetermined nodes can communicate with each other with unshared data while other nodes are precluded from communicating or even listening to the unshared data. A system which utilizes both a shared and an unshared topology is described in U.S. patent application Ser. No. 08/772,036 filed Dec. 12, 1996 now U.S. Pat. No. 5,914,957, entitled "Automatic Node Configuration with Identical Nodes", filed contemporaneously herewith.

However, utilizing such a dual communication architecture may require one set of bus wires connected to each of the nodes for providing a shared communication bus, and a separate set of wires connected between specifically designated groups of nodes which communicate with each other on the unshared link. Such double sets of wiring can be costly and time consuming to install in new and existing systems.

DISCLOSURE OF INVENTION

Objects of the invention include provision of a communication interface which minimizes the number of interconnecting lines between the nodes of systems which employ both shared and unshared communication.

According to the present invention a communication interface for a communication network having a plurality of nodes and a communication link connected between predetermined ones of the nodes which propagates bus data, includes a first shared communication circuit, to be connected in series with the link, which receives the bus data and passes shared data along the link; a second shared communication circuit, connected to one port of the first shared communication circuit, which receives the bus data from the link and passes the shared data, and which receives the shared data and couples the shared data onto the link; a first unshared communication circuit, connected to the one port of the first shared communication circuit, which receives the bus data from the link and passes the unshared data, and which receives the shared data and couples the unshared data onto the link; a second unshared communication circuit, connected to another port of the first shared communication circuit, which receives the bus data from the link and passes the unshared data, and which receives the shared data and couples the unshared data onto the link; and the first shared communication circuit not passing the unshared data.

According further to the present invention, the first shared communication circuit comprises a first shared filter and the second shared communication circuit comprises a second shared filter, the first and second shared filters passing a fundamental frequency of the shared data and not passing a fundamental frequency of the unshared data.

According still further to the present invention, the first unshared communication circuit comprises a first unshared filter and the second unshared communication circuit comprises a second unshared filter, the first and second unshared filters passing a fundamental frequency of the unshared data and not passing a fundamental frequency of the shared data.

The invention represents a significant improvement over the prior art by allowing networks with a plurality of nodes which employ both shared and unshared communication, to reduce number of interconnecting lines which must be used and installed between nodes. Also, the invention provides for flexible reconfigurable multiple topology communication interface which allows a single set of wires to be connected to all nodes in the system which communicate on the shared or unshared links. Accordingly, the invention reduces system installation costs by reducing wires and reducing the amount of time for installation, and allowing for easier retrofitting of existing shared communication networks which desire to upgrade to a shared/unshared communication network.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
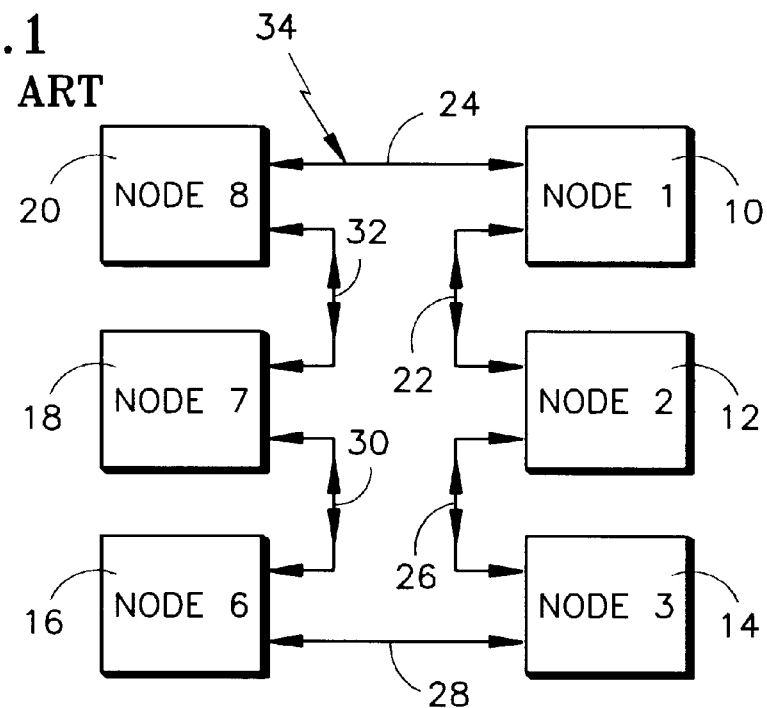
FIG. 1 is a block diagram of a prior art ring topology showing unshared point-to-point links between nodes of a network.

Referring to FIG. 1, one prior art network communication link known in the art utilizes a ring of unshared point-to-point connections 22–32 between a plurality of nodes 10–20. A connection 22 allows the node 10 to communicate with the node 12. Also, the connection 24 allows the node 10 to communicate with the node 20. In that case, the data passed along the connection 24 from the node 20 to the node 10 passes only to the node 10 and is not shared by the other nodes. Similarly, the node 12 is connected by an unshared connection 26 to the node 14. The node 14 is connected by an unshared connection 28 to the node 16. The node 16 is connected by an unshared connection 30 to the node 18. Finally, the node 18 is connected by an unshared connection 32 to the node 20. Thus, such an unshared communication topology allows each node to communicate only with those nodes which it is connected, all other nodes cannot be communicated with. All of the connections 22–32 are referred to collectively as a communication link 34. Each of the connections 22,24,26,28,30 and 32 may be bi-directional, thereby allowing data to pass in either direction along the link 34.

Figure 2:
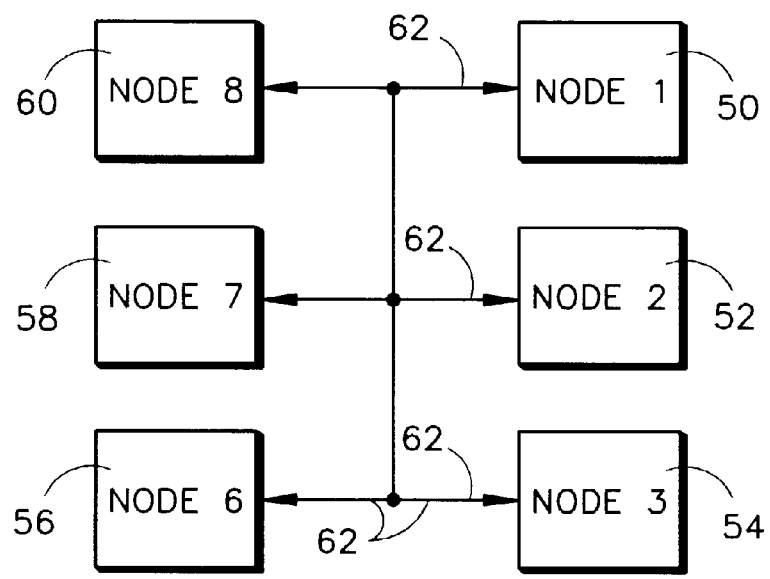
FIG. 2 is a block diagram of a prior art bus topology showing shared links between each of the nodes in a network.

Referring to FIG. 2, another prior network communication link comprises a shared bus topology whereby a plurality the nodes 50–60 are connected to each other by a shared communication link or bus 62. In that case, each of the nodes 50–60 is capable of communicating over the bus 62 with any other node, and each node is capable of communicating over the bus with any other nodes.

Figure 3:
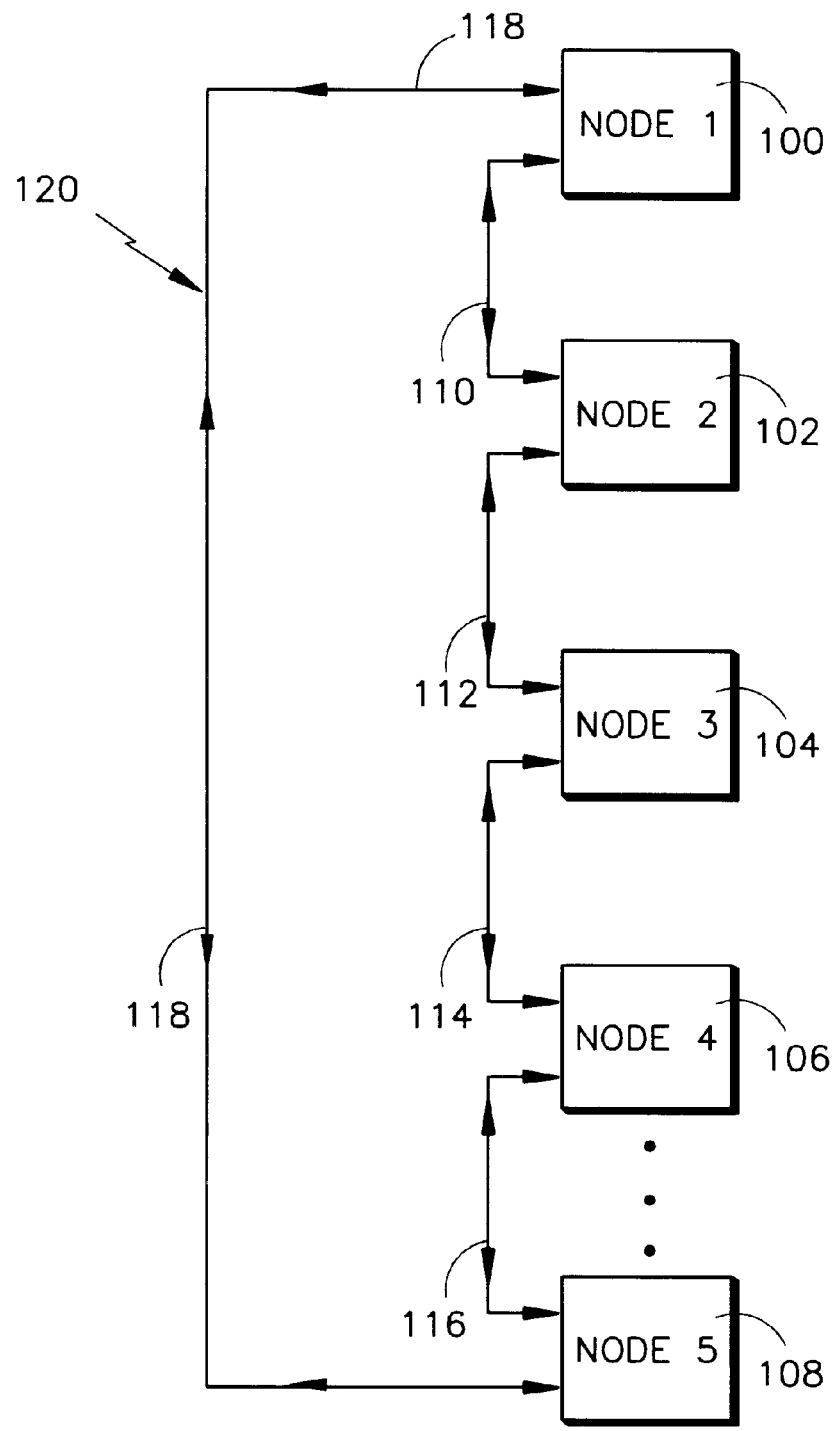
FIG. 3 is a schematic block diagram of a network having shared and unshared communications using a single communication link connecting a plurality of nodes, in accordance with the present invention.

Referring now to FIG. 3, the present invention allows a plurality of nodes 100–108 which are connected by bi-directional point-to-point connections 110–118 between adjacent nodes, to communicate shared data between all the nodes 100–108 and unshared data between predetermined ones of the nodes 100–108. The connections 110–118, collectively, are referred to herein as a communication link 120. The link may propagate combined shared and unshared data at various points along the link 120, and any data propagating at any given point on the link 120 is referred to herein as bus data.

Figure 4:
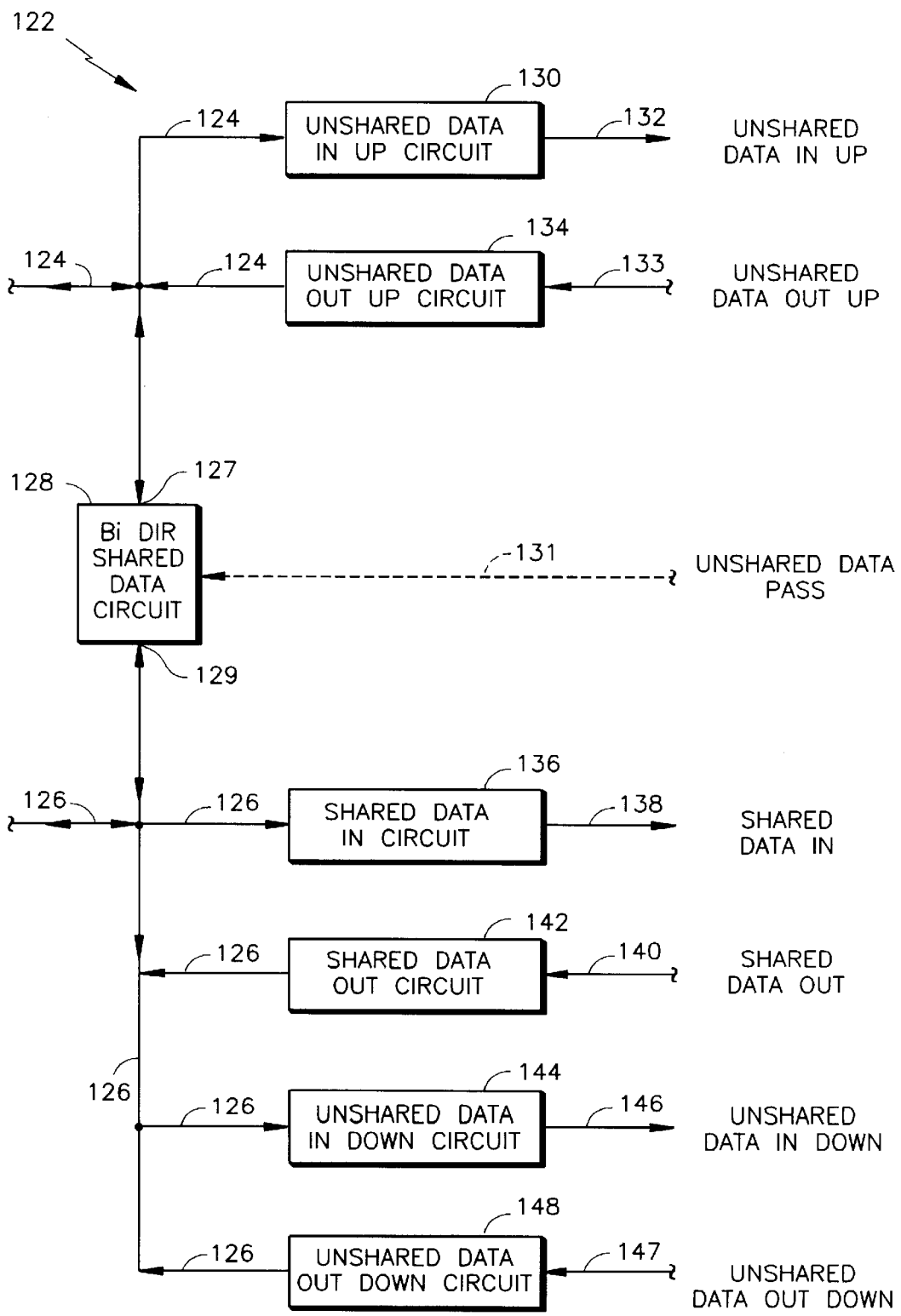
FIG. 4 is a schematic block diagram of a network communication link interface, in accordance with the present invention.

Referring now to FIG. 4, a network communication link interface 122 of the present invention has input/output (I/O) lines 124,126, which are connected to the communication link 120. There is one interface 122 for each of the nodes 100–108 (FIG. 4). For example, for the node 100, the line 124 would be connected to the line 118 (FIG. 3) and the line 126 (FIG. 4) would be connected to the line 110 (FIG. 3). The interface 122 or any portion thereof may be inside or outside the nodes 100–108, as desired. For illustrative purposes, the interface 122 is shown herein as being inside the nodes 100–108 (discussed hereinafter).

Referring to FIG. 4, a Bi-directional Shared Data Circuit 128 is connected between the link lines 124,126, in series with the communication link 120 (FIG. 3), having one I/O port 127 connected to the line 124 and another I/O port 129 connected to the line 126. The Bi-directional Circuit 128 receives bus data on the link 120 and passes the shared data component of the bus data and does not pass the unshared data component of the bus data (discussed hereinafter). As used herein, when a signal (or data) is referred to as not being passed by a circuit or filter it should be understood that the signal may actually be attenuated such that its amplitude is reduced to a predetermined acceptable level which allows the other desired portions of the signal to be detected and/or measured, as is known.

The Circuit 128 may be uni-directional if desired. In that case, the shared data may only pass along the link 120 in one direction. Also, the circuit 128 may receive an optional Unshared Data Pass signal on a line 131 which causes the circuit 128 to pass the unshared data, or predetermined frequency channels of unshared data (discussed hereinafter).

The line 124 is also connected to an Unshared Data In Up circuit 130 which provides an Unshared Data In Up signal on a line 132. The circuit 130 receives bus data on the line 124 and passes the unshared data component of the bus data and does not pass the shared data component of the bus data (disucssed hereinafter). An Unshared Data Out Up signal on a line 133 is fed to an Unshared Data Out Up Circuit 134 which couples the Unshared Data Out Up signal onto the line 124 and thus onto the communication link 120.

The line 126 is also connected to a Shared Data In Circuit 136 which provides a Shared Data In signal on a line 138. The circuit 136 receives bus data from the link 120 and passes the shared data component of the bus data and does not pass unshared data component of the bus data. A Shared Data Out signal on a line 140 is fed to a Shared Data Out Circuit 142 which couples the Shared Data Out signal onto the line 126 and thus onto the communication link 120.

The line 126 is also connected to an Unshared Data In Down Circuit 144, similar to the Unshared Data In Up Circuit 130 discussed hereinbefore, which provides an Unshared Data In Down signal on a line 146. The circuit 144 receives bus data on the line 126 and passes the unshared data component of the bus data and does not pass the shared data component of the bus data (discussed hereinafter). An Unshared Data Out Down signal on a line 147 is fed to an Unshared Data Out Down Circuit 148, similar to the Unshared Data Out Up Circuit 134, which couples the Unshared Data Out Down signal onto the line 126 and thus onto the communication link 120.

Figure 5:
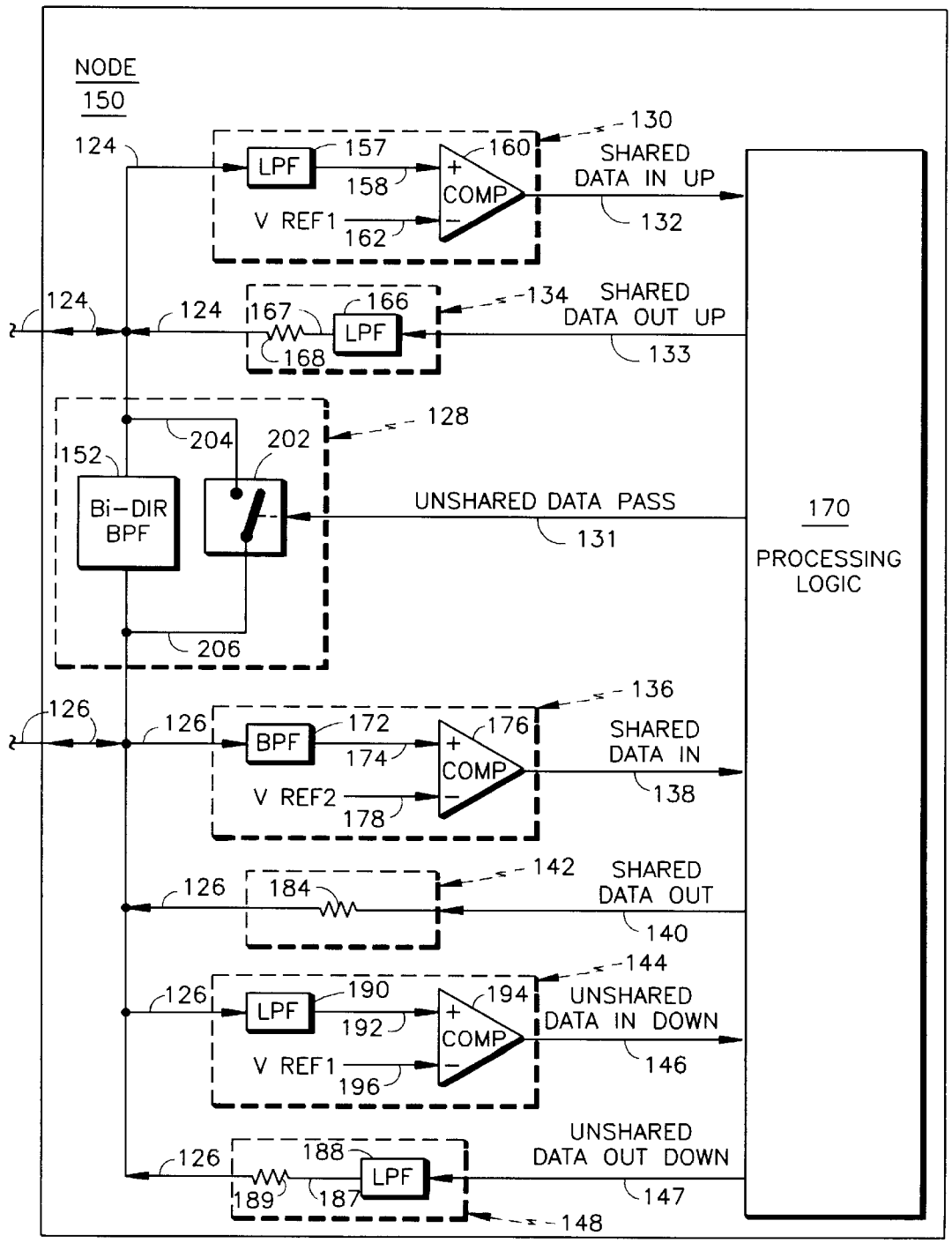
FIG. 5 is a schematic block diagram of a node for use in the network of FIG. 3 capable of shared and unshared communication, in accordance with the present invention.

Referring now to FIG. 5, the communication link interface 122 of FIG. 4, incorporated into a node 150, comprises a bi-directional bandpass filter (BPF) 152 which is connected between I/O lines 124,126. The node 150 is equivalent to each of the nodes 100–108 in FIG. 3.

The line 124 is connected to a lowpass filter (LPF) 157 which provides a low pass filtered signal on a line 158 to a positive input of a comparator 160. A negative input of the comparator 160 is connected to a reference voltage VRef1 by a line 162. The comparator 160 provides an Unshared Data In signal on the line 132 to Processing Logic 170.

The Processing Logic 170 receives data from the interface 122 and provides data to the interface 122 as described herein. The Processing Logic 170 comprises hardware and/or software which are capable of performing the desired functions of the specific node application. It may provide the appropriate interfaces for decoding data in signals and interfaces and/or drivers for providing the data out signals. The details of the Processing Logic 170 are not important for illustrating the present invention. Also, it should be understood that some or all of the functions of the interface circuit 122 may be performed within the Processing Logic 170 if desired. Also, the functions of the Processing Logic 170 may change based on the embodiment of the invention being described.

The Processing Logic 170 provides an Unshared Data Out Up signal on a line 133. The line 133 is connected to a lowpass filter (LPF) 166 which provides a filtered data signal on a line 167 to a resistor 168. The other side of the resistor 168 is connected to the line 124.

The line 126 on the lower side of the filter 152 is connected to a bandpass filter 172 which has substantially the same frequency response characteristic as the bandpass filter 152, except it need not be bi-directional, discussed hereinafter. The output of the bandpass filter is provided on a line 174 to a positive input of a comparator 176. A negative input of the comparator 176 is connected to a voltage reference VRef2 by a line 178. The comparator 176 provides a Shared Data In signal on the line 138 to the Processing Logic 170. The Processing Logic 170 also provides a Shared Data Out signal on the line 140 which is fed to one side of a resistor 184. The other side of the resistor 184 is connected to the line 126. The resistor is similar to the resistor 168 discussed hereinbefore.

The Processing Logic 170 provides the Unshared Data Out Down signal on a line 147 to a lowpass filter (LPF) 188. The output of the lowpass filter 188 is provided on a line 187 to a resistor 189. The other side of the resistor 189 is connected to the line 126. The resistor 189 is similar to the resistor 168 discussed hereinbefore.

The value of the resistors 168,184,189 are set to provide the appropriate impedance to allow the signals from the LPFs 166,188, to be coupled onto the communication link lines 124,126, respectively, with the desired amplitude.

The line 126 is also connected to a lowpass filter (LPF) 190 which provides a low pass filtered signal on a line 192 to a positive input of a comparator 194. A negative input of the comparator 194 is connected to a voltage reference VRef1 by a line 196. The comparator 194 provides an Unshared Data In signal on the line 146 to the Processing Logic 170.

Also, the Processing Logic 170 provides the Unshared Data Pass signal on the line 131 to a switch 202. One side of the switch 202 is connected to the top side of the BPF 152 by a line 204, and the other side of the switch 202 is connected to the lower side of the BPF 152, by a line 206. The switch 202 is an optional feature which acts to bypass (or place a short-circuit across) the bi-directional bandpass filter 152, thereby allowing the unshared signals to pass between the I/O lines 124,126. When the Unshared Data Pass signal on the line 131 is high, the switch 202 is closed and the unshared data is allowed to pass from the line 124 to the line 126, and thus, to subsequent nodes in the system. Conversely, when the Unshared Data Pass signal is low, the switch 202 is open and the BPF 152 prevents unshared data from passing between lines 124,126, as discussed hereinafter.

Figure 6:
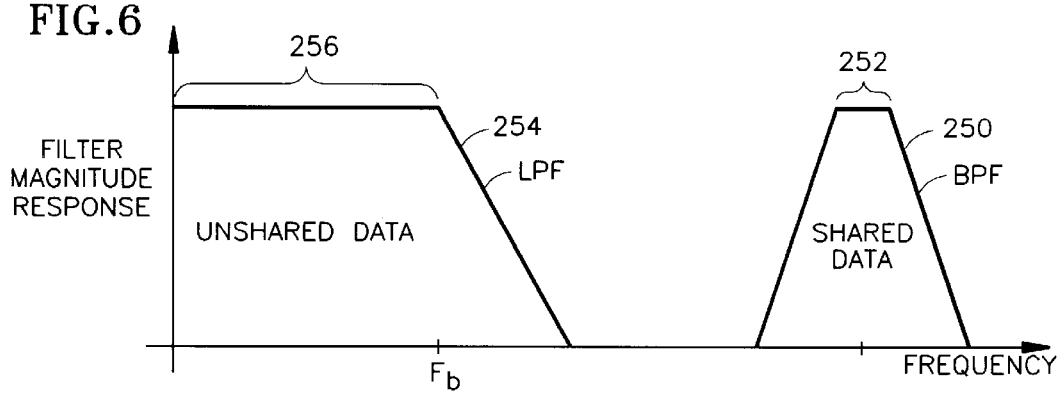
FIG. 6 is a magnitude frequency response diagram of band pass and low pass filters, in accordance with the present invention.

Referring to FIGS. 5 and 6, the invention partitions the data based on the fundamental or baseband frequency (or frequency range) of the data, which is determined by the bit rate of the data. The invention utilizes one range of frequencies for data which is shared by all nodes on the bus (i.e., shared data), and a different range of frequencies for data which is only shared between predetermined nodes or groups of nodes (i.e., unshared data).

In particular, the bi-directional bandpass filter 152 (FIG. 5) has a magnitude frequency response indicated by a curve 250 (FIG. 6) with a passband 252, which includes the fundamental frequency of the shared data. Thus, the bi-directional bandpass filter passes shared bus data between the lines 124,126, and does not pass (or attenuates) the unshared data so as to allow the bus data to be received simultaneously by all the nodes in the system. Similarly, the low pass filters, 157,190 have a magnitude frequency response curve 254 with a passband 256 (from dc to a break frequency Fb), which includes the fundamental frequency of the unshared data. Thus, the LPFs 157,190 pass the unshared data and do not pass the shared data. The LPFs 166,188 may have the same or similar magnitude frequency response and break frequency Fb as the LPFs 157,190; however, other break frequencies and magnitude responses may be used. The LPFs 157,190 are optional and provide filtering of the square wave data out signals to reduce some of the high frequency harmonic content of the square wave, thereby reducing the slope of the edges and the noise associated therewith.

Also, the passbands 252,256 should have a frequency range wide enough to cover the frequency range of the data content, as the baseband frequency of the data will change with the content (1-0) of the data. Further, to ensure the baseband frequency of the shared and unshared data is maintained within the passbands of the desired filters various known techniques may be employed. One technique known in the art is to employ "encoding" for each bit such that each bit width is partitioned into two parts, the first part having the data information and the second part being the inverse of the data information, thereby ensuring at least one logic transition for each bit transmitted. Another known technique is to perform "bit stuffing" where an additional inverted bit is inserted into the data stream at predetermined locations, e.g., at the end of a string of bits all having the same value. The length of the string is determined by the desired minimum baseband frequency. Any other baseband frequency preservation techniques may be used if desired, provided the baseband frequency of the data is maintained within the desired passband range.

Figure 7:
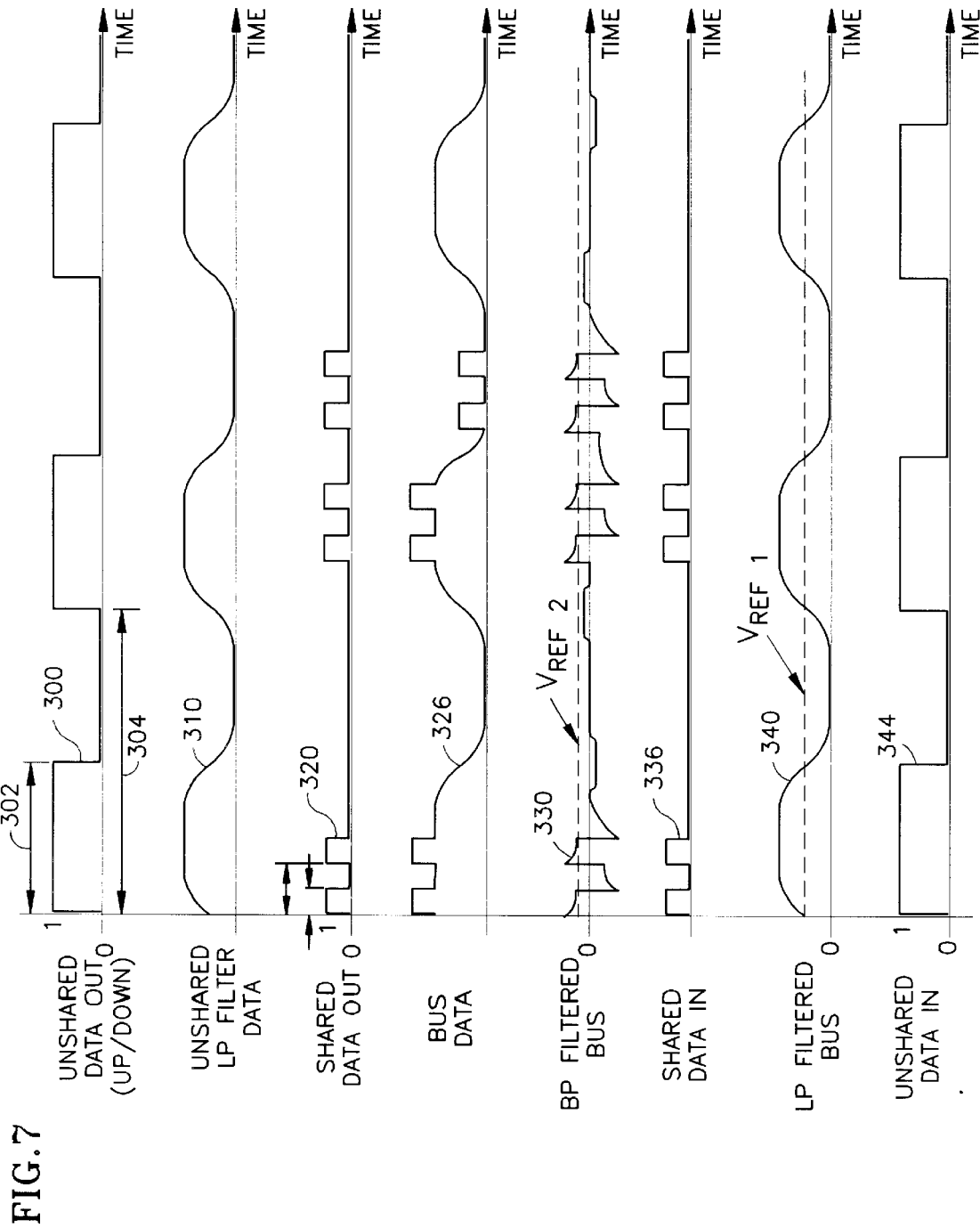
FIG. 7 is a series of time graphs showing various signals for the diagram of FIG. 5, in accordance with the present invention.

Referring now to FIGS. 5 and 7, a plurality of time graphs are shown, showing the waveforms at various points in the node 150. In particular, the Unshared Shared Data Out (up/down) signal on lines 133,147 is indicated by a curve 300. The signal 300 has a bit time width 302 which determines the bit or baud rate of the data and a minimum period (maximum bit rate change) 304 corresponding to its highest fundamental frequency (or baseband) at which the data can change state. A curve 310 shows the output of the lowpass filter 166 (FIG. 5).

The curve 320 is the Shared Data Out signal from the Processing logic 170 on the line 140. When the Shared Data Out and Unshared Data Out signals 310,320 are combined on the data bus, it appears as the curve 326. When the waveform 326 is passed through the bi-directional bandpass filter 152 (FIG. 5) and the bandpass filter 172, the resultant waveform is indicated by a curve 330 (FIG. 7) which is the signal on the line 174 (FIG. 5) to the comparator 176. The comparator 176 compares the signal 330 to a predetermined threshold VRef2, and when the signal 330 is above VRef2, the output signal on the line 138 is high. Alternatively, when the signal 330 on the line 174 is below the reference VRef2, the output signal on the line 138 is low. This is indicated by a curve 336 (FIG. 7).

The bus signal on the lines 124,126 (FIG. 5) is filtered by the low pass filters 157,190, respectively. The resultant signals on the lines 158,192, are shown as a curve 340 (FIG. 7) assuming that the bus signal 326 is applied to both the filters 157,190. The signal 340 is fed to the comparators 160,194 (FIG. 5), respectively, and compared against the reference voltage VRef1. The comparator converts the signal 340 to a square wave signal 344 in a similar manner to that discussed hereinbefore with respect to the comparator 176 except using the reference VRef1. The result is the Unshared Data In signals 344 on the lines 132,146 to the Processing Logic 170.

Figure 8:
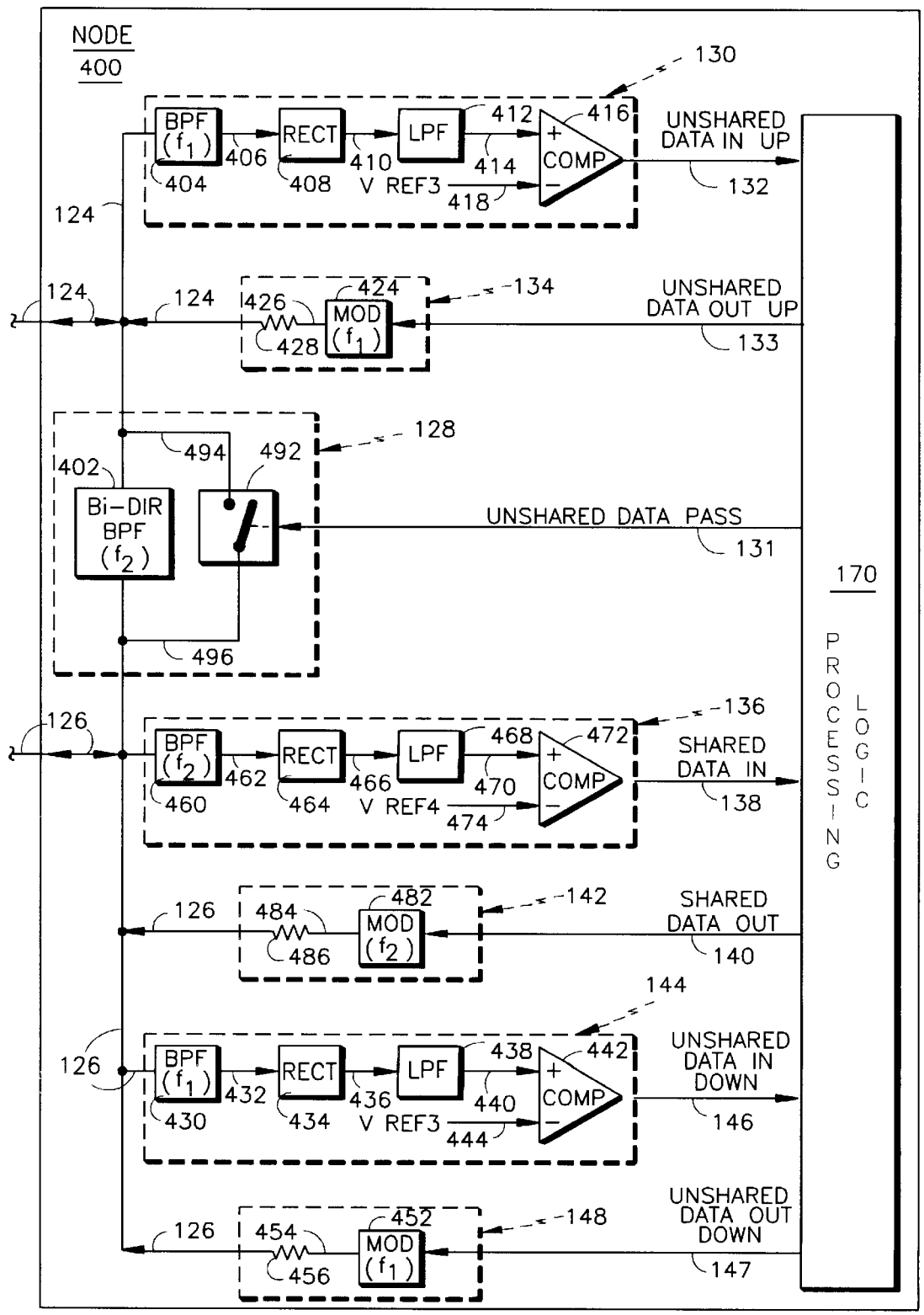
FIG. 8 is schematic block diagram of an alternative embodiment of a node for use in the network of FIG. 3, in accordance with the present invention.

Referring now to FIG. 8, an alternative generic node 400 comprises using a frequency signature (or modulation) for the shared and unshared data signals. In particular, a bi-directional bandpass filter (BPF) 402, having a passband which includes a frequency $f_2$, is provided between the lines 124,126.

The line 124 is also fed to a bandpass filter (BPF) 404 having a passband which includes a frequency $f_1$. The output of the bandpass filter 404 is fed on a line 406 to a full-wave rectifier 408 which full wave rectifies the signal on the line 406. A half wave rectifier may be used instead of the full-wave rectifier, if desired. A rectified signal from the rectifier 408 is provided on a line 410 to a lowpass filter 412. The lowpass filter 412 provides a filtered signal on a line 414 to a positive input of a comparator 416. The filtered signal on the line 414 is substantially the average value of the rectified signal on the line 410. The negative input of the comparator 416 is connected to a reference voltage VRef3 by a line 418. The comparator 416 provides the Unshared Data In Up signal on the line 132 to the Processing Logic 170. When the signal on the line 414 is greater than the voltage VRef3, the Unshared Data In signal is high (or a digital 1). Conversely, when the voltage on the line 414 is less than the voltage of VRef3, the output of the comparator 416 is low (or a digital 0).

The Processing Logic 170 provides the Unshared Data Out Up signal on the line 133 to a modulator 424, which provides a modulated signal on a line 426 at a modulated frequency $f_1$ for the length of time the input signal on the line 133 is high. The line 426 is connected to one end of a resistor 428 which provides the appropriate impedance for coupling the modulated signal onto the line 124, as discussed hereinbefore.

On the lower side of the bi-directional bandpass filter 402, the line 126 is connected to a bandpass filter 430 having a passband which includes the frequency $f_1$. The output of the bandpass filter 430 is provided on a line 432 to a full wave rectifier 434, which full wave rectifies the signal on the line 432. A half wave rectifier may be used, if desired. The rectified signal is provided on a line 436 to a lowpass filter 438. The lowpass filter 438 provides a filtered output signal on a line 440 to a positive input of a comparator 442. The negative input of the comparator 442 is connected to the voltage reference VRef3 on a line 444. The output of the comparator 442 is provided on the line 146 to the Processing Logic 170 as the Unshared Data In Down signal. The comparator 442 functions similar to the comparator 416 discussed hereinbefore.

The Processing Logic 170 provides the Unshared Data Out Down signal on the line 147, which is fed to a modulator 452, which provides a frequency burst at a frequency $f_1$ on a line 454 for the length of time the input signal on the line 147 is high. The line 454 is fed to a resistor 456 which provides the appropriate impedance for connecting to the line 126, as discussed hereinbefore.

The bandpass filter 430, the rectifier 434, the lowpass filter 438, the comparator 442, the modulator 452, and the resistor 456, are all similar to those described hereinbefore for the components above the bi-directional bandpass filter 402, i.e., the bandpass filter 404, the rectifier 408, the lowpass filter 412, the comparator 416, the modulator 424, and the resistor 428.

Regarding the shared data on the link, the line 126 is connected to a bandpass filter 460 which has a passband which includes a frequency $f_2$. The filter 460 is similar to the filter 402 except it need not be bi-directional. The output of the bandpass filter 460 is provided on a line 462 to a fullwave rectifier 464. A half wave rectifier may be used, if desired. The output of the rectifier 464 is provided on a line 466 to a lowpass filter 468. The lowpass filter 468 provides a filtered signal on a line 470 to a positive input to a comparator 472. The negative input to the comparator 472 is connected to a voltage reference VRef4 by a line 474. The comparator 472 provides the Shared Data In signal on the line 138 to the Processing Logic 170. The comparator 472 functions similar to the comparator 416 discussed hereinbefore.

The Processing Logic 170 provides the Shared Data Out signal on the line 140 to a modulator 482 which provides a frequency burst at the frequency $f_2$ on a line 484 for the length of time the signal on the line 140 is high. The line 484 is fed to a resistor 486 which provides the appropriate impedance for coupling the signal on the line 484 to the line 126 as discussed hereinbefore. The other side of the resistor 486 is connected to the line 126.

The Processing Logic 170 also provides the Unshared Data Pass signal on the line 131 to a switch 492, similar to the switch 202 discussed hereinbefore with FIG. 5. One side of the switch 492 is connected to the top side of the BPF 402 by a line 494, and the other side of the switch 492 is connected to the lower side of the BPF 402 by a line 496. The switch 492 is an optional feature which acts to bypass (or place a short-circuit across) the bi-directional bandpass filter 402, thereby allowing the unshared signals to pass between the I/O lines 124,126.

Figure 9:
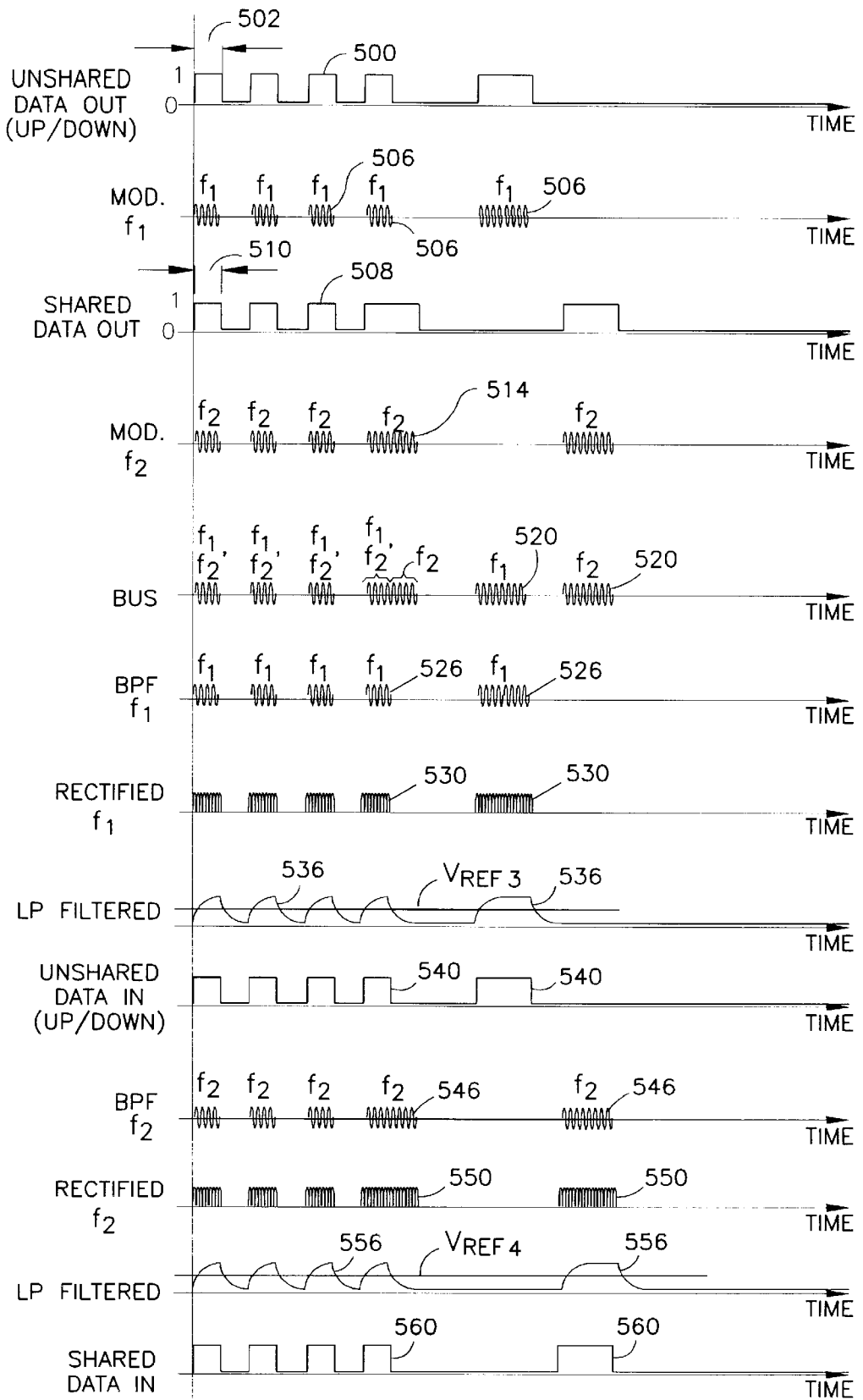
FIG. 9 is a series of time graphs showing various signals for the diagram of FIG. 8, in accordance with the present invention.

Referring now to FIG. 9, a series of time graphs are shown for the generic node 400 of FIG. 8 to illustrate the operation of the node 400. In particular, the Unshared Data Out (Up/Down) signals are indicated by a curve 500. The Unshared Data Out Signal Curve 500 has a bit time width 502 which determines the bit or baud rate of the data. The Unshared Data Out Curve 500 illustrates both the Unshared Data Out Up and Down signals on the lines 133,147 of FIG. 8 (if both signals had the same data pattern).

The Unshared Data Out signals are modulated by the modulators 424,452 (FIG. 8) as indicated by a series of frequency bursts 506 at the frequency $f_1$ when the Unshared Data Out Signal 500 is high (or a digital logic 1).

Similarly, the Shared Data Out signal is indicated by a curve 508 having a bit width 510 which determines the bit (or baud) rate of the data. The baud rates of the Unshared Data Out signals and the Shared Data Out Signal may be the same or different, as desired, and are not related (in this embodiment) to the signature (or modulation) frequencies $f_1,f_2$ associated with the Unshared and Shared Data, respectively.

The Shared Data Out signal is modulated by the modulator 482 to provide frequency bursts 514 at the frequency $f_2$ for the duration of time that the Shared data Out Curve 508 is high.

The summation of the modulated Unshared Data Out signal and the modulated Shared Data Out signal is indicated by a Bus signal curve 520. The curve 520 is indicative of the signal that may be on the bus lines 124 or 126 at any given time, depending on the direction of the signal traffic and which nodes are transmitting data.

The bandpass filters 404,430 (FIG. 8) receive the bus signal 520 (FIG. 9), and pass only the frequency $f_1$, as indicated by a curve 526, which is substantially the same as the modulated waveform 506 of the Unshared Data Out signal. The rectifier 408 (FIG. 8) rectifies the signal 526 (FIG. 9) as indicated by the curve 530. The lowpass filters 412,438 filter the fullwave rectified waveform 530, and provide a waveform as indicated by a curve 536. The waveform 536 is passed to the comparator 416 (FIG. 8) and compared against the reference VRef3 which provides the Unshared Data In signal, as indicated by a square wave 540 (FIG. 9).

The Bus signal 520 is provided to the bandpass filter 460 (FIG. 8) which passes only the frequency $f_2$, thereby providing a series of frequency bursts at the frequency $f_2$, as indicated by a curve 546. The curve 546 is substantially the same as the curve 514. The signal 546 is provided to the rectifier 464 (FIG. 8) which fullwave rectifies the curve 546 as indicated by a curve 550 (FIG. 9). The signal 550 is fed to the lowpass filter 468 (FIG. 8) which provides a filtered signal as indicated by a curve 556 (FIG. 9). The signal 556 is provided to the comparator 472, and compared against the reference VRef4 to provide an output signal from the comparator 472 as indicated by a square wave 560.

It should be understood that it may be desirable to provide some amount of hysteresis for the comparators 416,442,472 of FIG. 8 and comparators 160,176,194 of FIG. 5, so as to reduce erroneous transitions in the output signal from the comparator.

Figure 10:
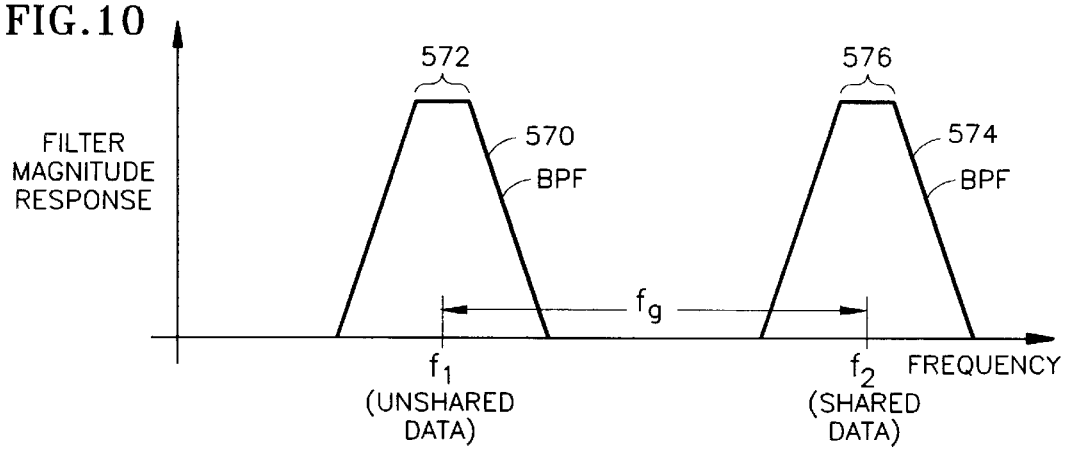
FIG. 10 is a magnitude frequency response diagram of band pass filters, in accordance with the present invention.

Referring now to FIG. 10, the magnitude frequency response of the bandpass filters 404,430 is indicated by a curve 570, having the frequency $f_1$ in the passband 572. Similarly, the magnitude frequency response of the bandpass filters 402,460 (which pass the shared data) is indicated by a curve 574 which has the frequency $f_2$ in the passband 576.

Even though in FIG. 10, $f_1$ (for the unshared data) is shown to be at a lower frequency than $f_2$ (for the shared data), this is an arbitrary distinction and $f_2$ may, if desired, be lower than $f_1$. The only requirement is that $f_1$ and $f_2$ be at different frequencies, so they can be distinguished and separated, utilizing appropriate filtering.

It should be understood that the modulation technique shown in FIGS. 8–10 allows the shared and unshared data rates (or baud rates) to be selected independent of which signal is shared and unshared. Also, it may be desirable to separate the center frequencies of the bandpass filters by a guardband frequency range $f_g$ to allow for some variations in the modulation frequencies $f_1,f_2$ to prevent overlap of the shared and unshared frequency bands.

It should be understood that the bypass switches 202,492 (FIGS. 5,8, respectively) may be any form of an electronic switch which will pass or block electronic signals from passing therethrough, e.g., a transistor configuration, an analog switch, a solid state switch, a relay, etc., or any combination thereof.

The switch 492 in FIG. 8 would be closed in the event that it is desired for the unshared data to be shared by more than just two nodes, e.g., in the event of a faulted node, or a particular communication protocol which requires messages to be shared between some, but not all of the nodes. For the nodes where the switches 202, or 492 is closed, one of the Unshared Data In signals may be ignored by the Processing Logic 170 and the Processing Logic 170 need not provide the Unshared Data Out signal on one of the lines 133,147 (FIGS. 5,8).

Figure 11:
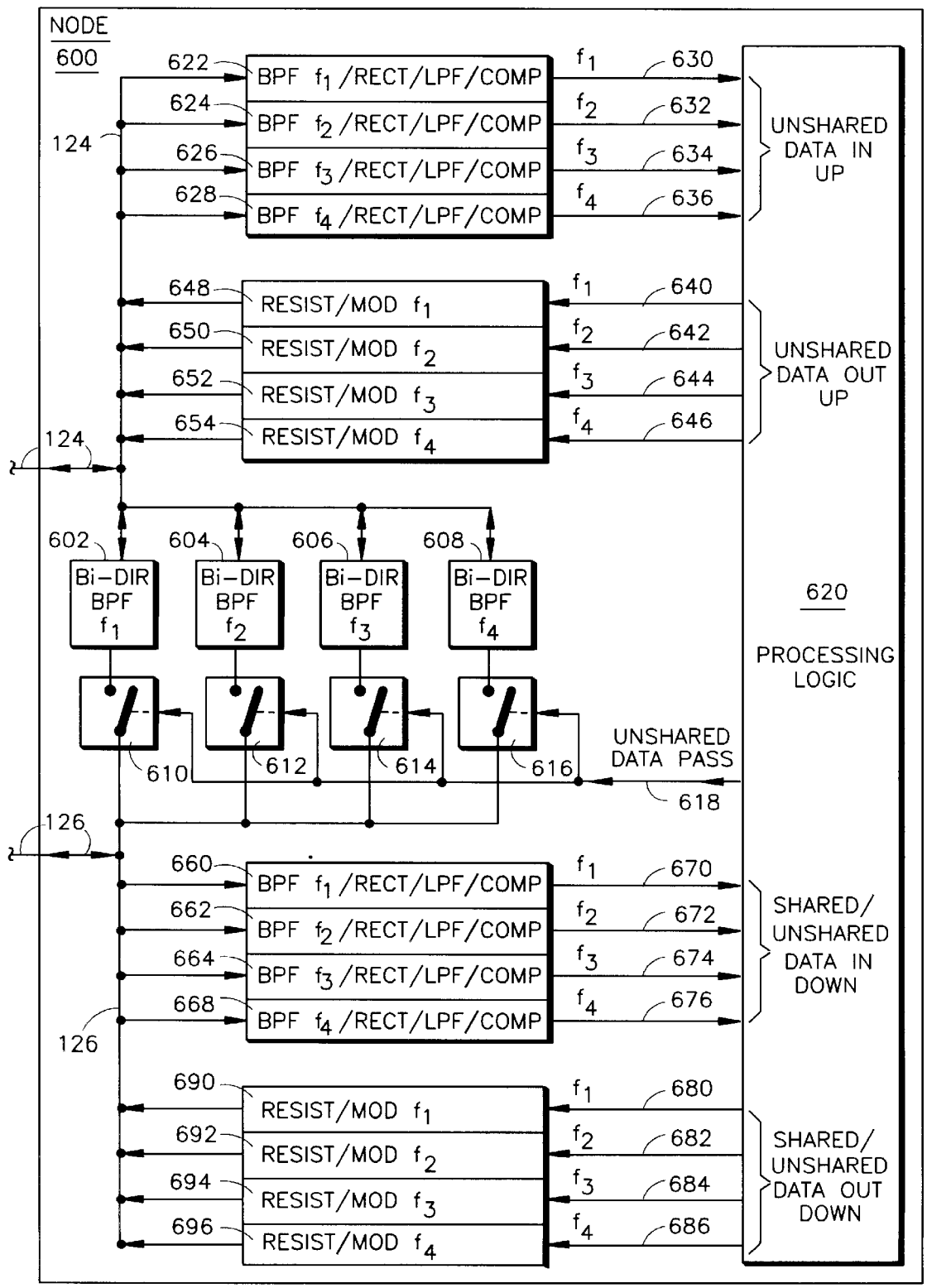
FIG. 11 is schematic block diagram of an alternative embodiment of a node for use in the network of FIG. 3, in accordance with the present invention.

Referring now to FIG. 11, using the modulation technique described in FIG. 8, multiple different unshared communication topologies may be configured among the nodes by utilizing a plurality of modulation frequencies. In particular, for a four frequency system ($f_1,f_2,f_3,f_4$), the nodes may be configured in any desired pattern of shared and unshared communication topologies using the single communication link 120.

More specifically, the line 124 is connected to one side of four bi-directional bandpass filters (BPF's) 602–608, all connected in parallel, each having passband frequency ranges which include the frequencies $f_1,f_2,f_3,f_4$, respectively. In series with the BPFs 602–608 are switches 610–616, respectively. The switches 610–616 are controlled by Unshared Data Pass signals on control lines 618 which are provided from the Processing Logic 170. The lower side of the switches 610–616 are connected to the line 126.

The line 124 is also connected to four circuits 622–628, each corresponding to one of the frequencies $f_1,f_2,f_3,f_4$, respectively. Each of the circuits 622–628 comprises a bandpass filter having a passband which includes the corresponding frequency $f_1-f_4$, a rectifier, a lowpass filter, and a comparator, similar to the circuits 404,408,412,416 described in FIG. 8 for providing the Unshared Data In signal. The output signals from the circuits 622–628 are Unshared Data In Up signals provided on lines 630–636 to the Processing Logic 170, each corresponding to one of the four frequency channels $f_1-f_4$, respectively.

Similarly, Unshared Data Out Up signals are provided on lines 640–646 from the Processing Logic 170, to be transmitted on four different frequency channels $f_1-f_4$, respectively. The lines 640–646 are fed to circuits 648–654, respectively, each comprising a modulator corresponding to the frequency channel associated with that circuit, and a corresponding series resistor, similar to the modulator 424 and resistor 428 discussed in FIG. 8. The output of the circuits 648–654 are all connected together and to the line 124.

On the lower side of the bandpass filters 602–608, the line 126 is connected to the circuits 660–668, each comprising a bandpass filter, a rectifier, a lowpass filter, and a comparator, and each corresponding to a specific frequency channel $f_1-f_4$, respectively. Each of the circuits 660–668 are similar to the circuits 622–628, discussed hereinbefore in FIG. 8. The circuits 660–668 provide the Shared and/or Unshared Data In Down signals on the lines 670–676 to the Processing Logic 170, each corresponding to one of the frequency channels $f_1-f_4$, respectively.

The Processing Logic 170 also provides Shared/Unshared Data Out Down signals on lines 680–686, each corresponding to one of the frequency channels, $f_1-f_4$, respectively. The signals on the lines 680–686 are fed to circuits 690–696, respectively, each comprising a modulator corresponding to the frequency channel associated with that circuit, and a corresponding series resistor, similar to that discussed hereinbefore, for the circuits 648–654. The output signals from the circuits 690–696 are all connected together and to the line 126 for connection onto the bus.

It should be understood that the circuits 660–668, 690–696 are grouped together as input and output signals, respectively; however, they may be arranged in any desired order. Also, any one or more of the frequencies f1–f4 may be used as shared data for communication with all the network nodes if desired.

Figure 12:
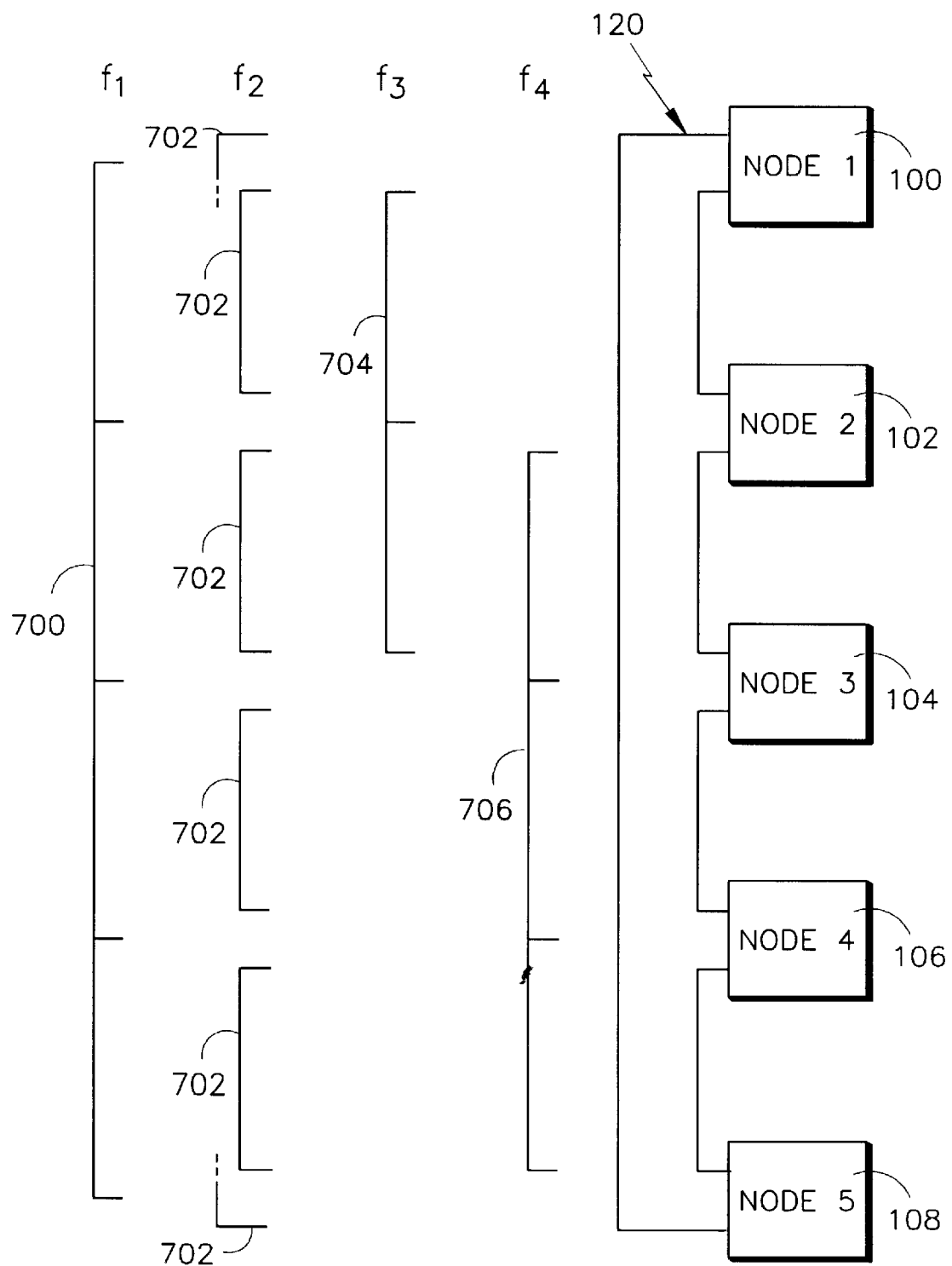
FIG. 12 is block diagram of the nodes in FIG. 3 showing communication paths between nodes for a four frequency channel topology, in accordance with the present invention.

Referring now to FIG. 12, the generic node 600 (FIG. 11) allows for a plurality of different shared and unshared communication paths to be configured for a given set of nodes over the communication link. In particular, for the five nodes 100–108, the frequency $f_1$ may be utilized as a totally shared data communication path as indicated by a line 700. In that case, the Processing Logic 170 (FIG. 11) would set the switch 610 to the closed position for each of the five nodes 100–108. Also, it would ignore the signal on the line 630 corresponding to $f_1$, and not provide a data output signal on the line 640, as these would be redundant to the signals received and provided on the lines 670,680, respectively. Also, the frequency $f_2$ may be configured as totally unshared point-to-point paths, as indicated by the lines 702, which allow for data communication between adjacent nodes only. In that case, the Processing Logic 170 would have the switch 612 in the open state for each of the nodes 1–5.

Further, for the frequency $f_3$, the nodes may be configured in a partially unshared configuration, as indicated by the line 704. In that case, the nodes 100,102,104 can each communicate with each other; however, they cannot communicate with the nodes 106,108 on the $f_3$ frequency channel. Also, in that case, the Processing Logic 170 for the node 102 would set its switch 614 to the closed position, thereby allowing the line 124 to be connected to the line 126 for $f_3$ modulated data. Further, node 102 would ignore input data on the line 634 and not provide output data on the line 644 associated with the frequency $f_3$, as this would be redundant to data received on the line 674 and provided on the line 684, respectively.

Still further, the nodes 100–108 may be connected in another partially unshared communication configuration as indicated by a line 706. In that case, the nodes 102,104,106, 108 can each communicate with each other over the frequency channel. However, the node 108 cannot communicate with node 100, and node 102 cannot communicate with node 100 on the $f_4$ frequency channel. In that case, the Processing Logic 170 for the nodes 104,106 would set the switch 616 to the closed position, thereby allowing data modulated at the frequency $f_4$ to be passed through the nodes 104,106, thereby allowing the nodes 102,104,106,108 to communicate with each other. Also, in that case, the Processing Logic 170 for the nodes 104,106 would ignore the input signals on the lines 636 and not provide data on the output lines 646, as this would be redundant to the signals received and transmitted on the lines 676,686, respectively.

The shared/unshared communication path topology shown in FIG. 12 is merely one example of a set of shared/unshared paths that can be configured with the generic multi-frequency communication link interface of FIG. 11. It should be understood that many other shared and/or unshared communication path topologies may be created. Furthermore, the link 120 need not use four frequencies, but may use any number of frequencies less than or greater than 4, with a corresponding change in the circuits discussed hereinbefore.

Figure 13:
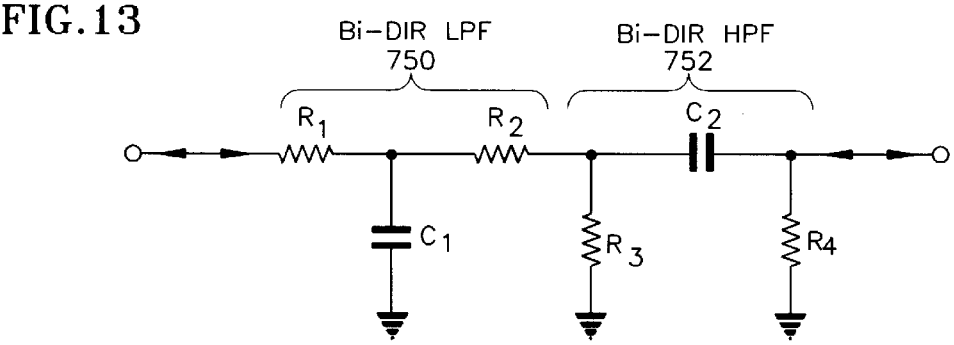
FIG. 13 is schematic diagram of a bi-directional bandpass filter, in accordance with the present invention.

Referring now to FIG. 13, one example of the bi-directional bandpass filters 152,402 of FIGS. 5,8, respectively, comprises a bi-directional lowpass filter 750 having a resistor $R_1$ and a resistor $R_2$ connected in series, with a capacitor $C_1$ connected between the resistors $R_1$ and $R_2$ to ground potential. The bi-directional lowpass filter 750 is connected in series with a bi-directional highpass filter 752 comprising a resistor $R_3$ to ground, and a resistor $R_4$ to ground, having a compacitor $C_2$ connected between $R_3$ and $R_4$. Any other bi-directional bandpass filter implementation may be used, if desired. Also, all the lowpass filters and highpass filters described herein may be implemented either by solely passive components or by a combination of passive and/or active components, e.g., op-amps.

Further, it should be understood that the bandpass filters, rectifier, lowpass filters, and comparators, as well as the corresponding frequency modulators and resistors, may be placed on either side of the bi-directional bandpass filters (connected between the lines 124,126) for frequencies that are shared data frequencies in FIGS. 5,8, and 11.

Also, it should be understood that the embodiment of FIG. 5 (unmodulated data) and the embodiment of FIG. 8 (modulated data) may be combined such that either shared or unshared data is modulated as in FIG. 8 and the other is unmodulated as in FIG. 5, if desired.

Further, instead of the bandpass filters 152,172 (FIG. 4) or other bandpass filters described herein which are used to pass the highest frequency data, the invention may use high pass filters to pass such high frequency data. However, in that case, there may likely be more noise due to less attenuation of high frequencies.

Further, it is not required to have two unshared data out signals and two unshared data in signals, there may be one of each with multiplexing/de-multiplexing or other switching logic used to select the desired output signals, such as is discussed in the aforementioned Patent Application. Also, one application of a shared and unshared data communication system is described in the aforementioned patent application.

Also, other configurations, topologies, frequencies, waveforms, and/or passive/active components from those illustrated herein may be used for the circuits 130,134,136, 142, 144,148 (FIG. 4) if desired, provided the shared bus signals are allowed to pass and the unshared data is not allowed to pass (or is attenuated) between the lines 124,126 through the Bi-directional Shared Data Circuit (if the bypass feature discussed hereinbefore is utilized, the unshared data is selectively passed and not passed), the unshared data is allowed to pass through and shared data is not allowed to pass (or is attenuated) through the Unshared Data In Circuits, and the shared data is allowed to pass through and the unshared data is not allowed to pass (or is attenuated) through the Shared Data In Circuit.

Further, any number of nodes may be connected to the link 120 and use the present invention.

Also, instead of using electrical wires and signals as the connections 110–118 making up the communication link 120, optical waveguides, e.g., optical fibers, and optical signals may be used instead. In that case, the appropriate optical-to-electrical conversion interfaces would likely be employed. Also, one of the data signals may be a static dc signal level if desired, such as that described in the aforementioned patent application. In that case, the filtering circuits for input and/or output data may be simplified if desired in a known way.

Although the invention has been described and illustrated with respect to the exemplary embodiments thereof, it should be understood by those skilled in the art that the foregoing and various other changes, omissions and additions may be made without departing from the spirit and scope of the invention.

I claim:

1. A communication interface for a communication network having a plurality of nodes and a communication link connected between predetermined ones of the nodes which propagates bus data including shared data and unshared data, comprising:
   a first shared communication circuit comprising a first shared filter, to be connected in series with said link, which receives the bus data and passes a fundamental frequency of said shared data along said link;

a second shared communication circuit comprising second shared filters and connected to one port of said first shared communication circuit, which receives the bus data from said link and passes a fundamental frequency of said shared data, and which receives said shared data and couples a fundamental frequency of said shared data onto said link;

a first unshared communication circuit, connected to said one port of said first shared communication circuit, which receives the bus data from said link and passes said unshared data, and which receives said unshared data and couples said unshared data onto said link;

a second unshared communication circuit, connected to another port of said first shared communication circuit, which receives the bus data from said link and passes said unshared data, and which receives said unshared data and couples said unshared data onto said link; and said first and second shared filters not passing a fundamental frequency of said unshared data.

2. The communication network of claim 1 wherein said first and second shared filters comprise bandpass filters.

3. The communication network of claim 1 wherein said first and second shared filters comprise highpass filters.

4. The communication network of claim 1 wherein fundamental frequency of said shared data comprises a first harmonic frequency of said shared data.

5. The communication network of claim 1 wherein fundamental frequency of said shared data comprises a modulation frequency of said shared data.

6. The communication network of claim 1 wherein said first shared filter comprises a bidirectional filter.

7. The communication network of claim 1 wherein said first unshared communication circuit comprises a first unshared filter and said second unshared communication circuit comprises a second unshared filter, said first and second unshared filters passing a fundamental frequency of said unshared data and not passing a fundamental frequency of said shared data.

8. The communication network of claim 7 wherein said first and second unshared filters comprise bandpass filters.

9. The communication network of claim 7 wherein said first and second unshared filters comprise lowpass filters.

10. The communication network of claim 7 wherein said fundamental frequency of said unshared data is a first harmonic frequency of said unshared data.

11. The communication network of claim 7 wherein said fundamental frequency of said unshared data is a modulation frequency of said unshared data.

12. The communication network of claim 1 wherein said first shared communication circuit selectively passes said unshared data in response to a data pass signal.

13. A communication interface for a communication network having a plurality of nodes and a communication link connected between predetermined ones of the nodes which propagates bus data including shared data and unshared data, comprising:

a first shared communication circuit comprising a first shared filter and having at least two ports by means of which said first shared communication circuit is connected in series with said link, which receives the bus data and passes a fundamental frequency of said shared data along said link;

a second shared communication circuit comprising second shared filters and connected to one of said ports of said first shared communication circuit, which receives the bus data from said link and passes a fundamental frequency of said shared data, and which receives said shared data and couples a fundamental frequency of said shared data onto said link;

a first unshared communication circuit, connected to said one port of said first shared communication circuit, which receives the bus data from said link and passes said unshared data, and which receives said unshared data and couples said unshared data onto said link;

a second unshared communication circuit, connected to another of said ports of said first shared communication circuit, which receives the bus data from said link and passes said unshared data, and which receives said unshared data and couples said unshared data onto said link; and said first and second shared filters not passing a fundamental frequency of said unshared data.

* * * * *